United States Patent [19]

Farfor

[11] 3,897,186
[45] July 29, 1975

[54] APPARATUS FOR MAKING REINFORCED CEMENT PANELS

[75] Inventor: James Douglas Farfor, Brighton, Australia

[73] Assignee: Fictor Pty. Limited, Australia

[22] Filed: Jan. 17, 1974

[21] Appl. No.: 434,239

[30] Foreign Application Priority Data
Jan. 17, 1973  Australia............................. 1939/73
Mar. 6, 1973  Australia............................. 2495/73

[52] U.S. Cl. .................... 425/85; 264/87; 425/110; 425/258; 425/432; 425/456
[51] Int. Cl.............................................. B28b 1/08
[58] Field of Search .......... 264/87; 425/85, 84, 110, 425/456, 258, 432

[56] References Cited
UNITED STATES PATENTS

| 2,353,492 | 7/1944 | O'Connor ....................... 425/432 X |
| 2,671,940 | 3/1954 | Billner ................................... 425/85 |
| 2,701,904 | 2/1955 | Roensch ............................... 425/85 |
| 2,915,801 | 12/1959 | Harry................................. 425/84 X |
| 3,196,513 | 7/1965 | Parma............................. 425/432 X |
| 3,697,631 | 10/1972 | Charman, Jr. et al................ 425/84 |

Primary Examiner—Robert L. Spicer, Jr.
Attorney, Agent, or Firm—Larson, Taylor and Hinds

[57] ABSTRACT

Reinforced cement panels are produced between a fixed lower mould and a movable upper mould each having a moulding surface covered with filter cloth. Suction is applied through ports in the lower mould to extract air and residual water, reinforcement is placed on the lower mould, a layer of slurry of uniform thickness is applied by traversing a depositor over the lower mould, and the upper mould is rested on the surface of the slurry. Vacuum is applied through arched connections from upper parts of manifolds on the upper mould and through passages in the upper mould to the filter cloth thereof to withdraw moisture from the slurry to create an uncured panel. Water-containing foam is admitted through the ports in the lower mould to release the uncured panel, whereupon the upper mould is raised with the uncured panel held thereto, traversed to a different position to rest the uncured panel on a support. Water-containing foam is then admitted through the arched connections of the upper mould to the filter cloth thereof to release it from the uncured panel. The upper mould is surrounded by clamping strips which seat on the slurry at the boundary of the mould and provide an impervious seal in this region.

8 Claims, 4 Drawing Figures

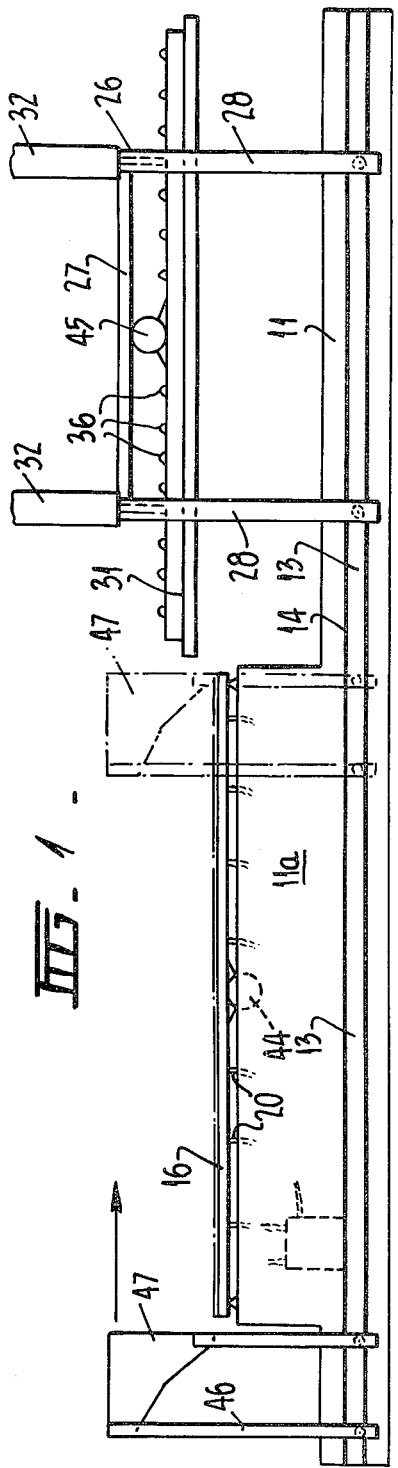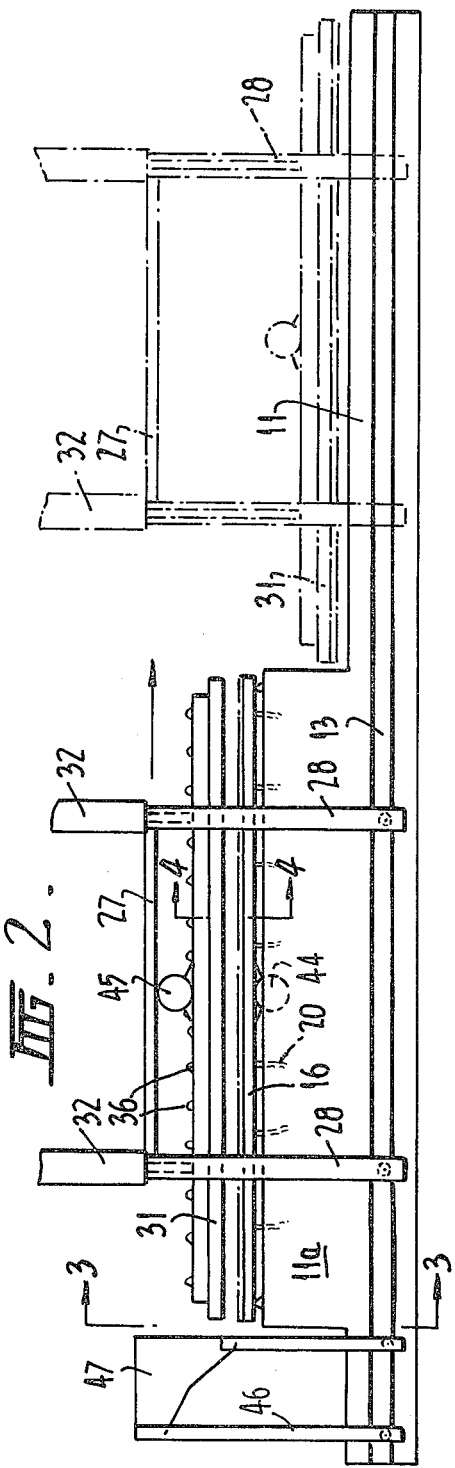

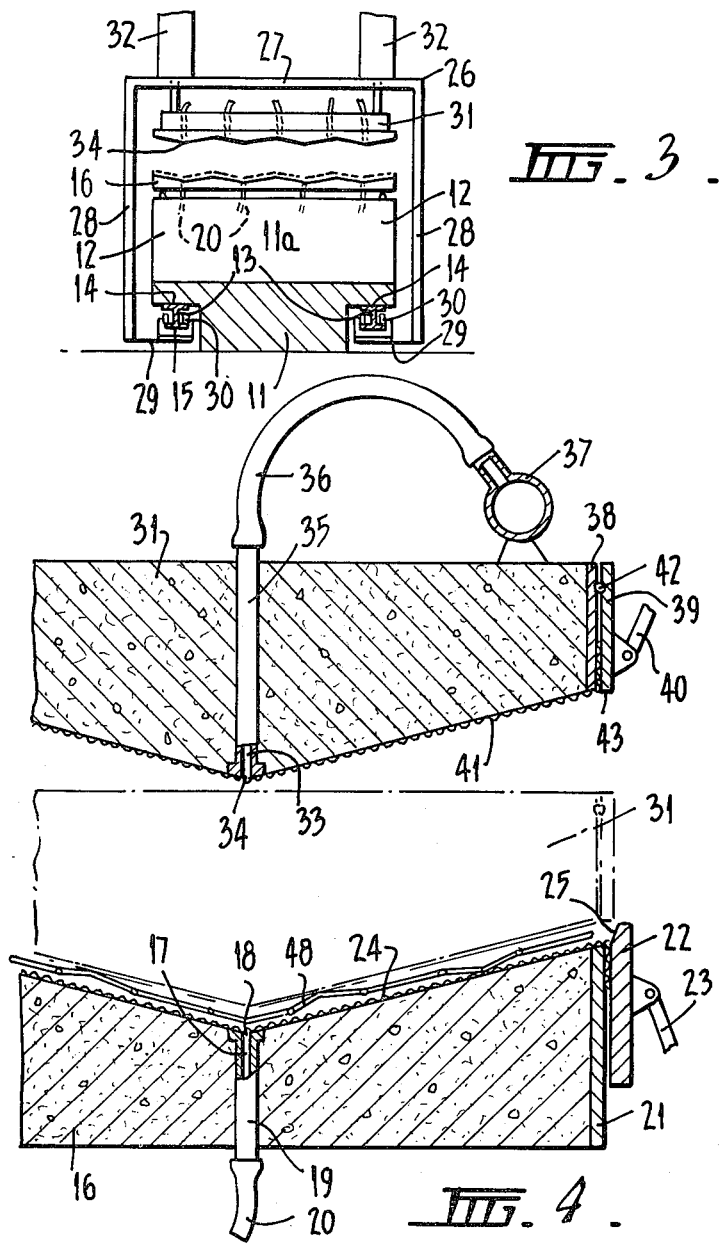

APPARATUS FOR MAKING REINFORCED CEMENT PANELS

This invention relates to a method and apparatus for making reinforced cement panels and is concerned more particularly with panels suitable for the construction of fences or for other purposes such as wall cladding and roofing material.

A primary object of the invention is to provide for the economic production of panels of a consistently good standard as regards structural quality and appearance.

With this object in view a method of producing reinforced cement panels according to the invention broadly resides in applying a slurry of cementitious material over a lower mould with reinforcement embedded in the slurry, applying an upper mould of complementary shape to the lower mould above the slurry and confining the slurry between the moulds, applying suction through spaced ports in at least one of the moulds to extract moisture from the slurry and produce an uncured panel therefrom, raising the upper mould with the uncured panel held thereto, and transferring it to deposit the uncured panel in a position remote from the lower mould.

Apparatus according to the invention broadly comprises a fixed lower mould, slurry depositing means for applying a layer of slurry to the lower mould, an upper mould having a lower surface shaped complementarily to the upper surface of the lower mould, means for moving the upper mould between one position in which it is above the lower mould and a second position in which it is remote from it, and means for applying suction through the upper mould to the lower surface thereof.

Preferably both the upper and lower mould surfaces have spaced ports through which suction can be applied to withdraw moisture and through which a small quantity of liquid can be transmitted through to the appropriate surface to the uncured panel to release it from the surface at the appropriate stage.

Preferably also each mould surface is provided with a layer of filter cloth whereby the moisture can be withdrawn in a uniform manner over the full surface area of the mould.

Other objects and features of the invention will be evident from the following description of a preferred form thereof. In this description reference is made to the accompanying drawings in which:

FIG. 1 is a schematic view in side elevation of apparatus according to this particular form of the invention, FIG. 2 is a view similar to FIG. 1 but with the upper mould positioned above the lower mould, FIG. 3 is a view in section on line 3—3 of FIG. 1, and FIG. 4 is a fragmentary sectional view on the line 4—4 of FIG. 2 on a larger scale.

Apparatus according to this preferred form of the invention comprises a bed 11 which is rigidly supported on a floor or other foundation and has lateral projections 12 which form longitudinally extending recesses at the bottom of the bed, one at each side. The recesses provide a housing for two horizontal rails 13 which extend parallel to each other in the longitudinal direction. The rails 13 are each provided with an upper flange 14, whereby they are supported from the lower faces of the lateral projections 12, and with a lower flange 15. The upper surfaces of the flange 15 on each side of the rail web, provide running surfaces for trolleys carrying other parts of the apparatus which are hereinafter described.

The bed 11 has a raised part 11a which does not extend the full length of the bed. At the forward end, which is the right-hand end as seen in FIGS. 1 and 2, the bed 11 and rails 13 extend beyond the raised part 11a for a distance substantially equal to its length, whereas at the rear end the distance by which the bed 11 and rails 13 extend beyond the raised part 11a is much shorter. The raised part 11a supports a lower mould 16 of rigid formation, made of concrete or other suitable material. The upper surface of the mould 16 is shaped to suit the desired shape of panel to be produced in the apparatus, and in the form shown this is a shallow zig-zag, comprising plane surfaces sloping in alternating directions and joining each other at equally spaced crests and troughs. Within the mould 16 passages 17 are formed. These passages open through ports located at spaced intervals along the troughs of the mould 16. FIG. 4 shows in greater detail part of the mould 16 with one of the passages 17 and the corresponding port 18 opening into the trough nearest to the right-hand edge of the mould 16. As indicated by this Figure the passage 17 and port 18 are conveniently formed by a tubular member 19 embedded in the mould 16 during its manufacture and projecting below the lower surface of the mould to enable a flexible tube 20 to be connected to it. A suitable diameter for the tubular members 19 is 3 mm. and a suitable spacing in the longitudinal direction is 600 mm. Preferably the members in each trough are located midway between the position of those in adjacent troughs.

Still, with particular reference to FIG. 4 the mould 16 has a permanently attached edge strip 21 extending along each longitudinally extending edge, the upper edge of the strip 21 being flush with the upper surface of the mould. Corresponding strips (not shown) are attached to the ends of the mould 16, their upper edges being shaped to correspond to the shape of the upper surface of the mould. The mould 16 is also equipped with clamping strips 22 which are arranged to engage against the outer faces of the edge strips 21. Suitable quick-action release clamps 23, illustrated diagrammatically in FIG. 4, are provided to enable the clamping strips 22 to be clamped firmly against the edge strips 21, and to be readily freed from such engagement, when this is required. The primary purpose of the clamping strips 22 is to hold in position on the upper surface of the mould 16 a piece of filter cloth 24. A suitable cloth for the purpose is made of woven nylon. The clamping strips 22 project above the adjacent upper surface of the mould and the filter cloth 24 and at the inner side the strips 22 are provided with upwardly and outwardly sloping surfaces 25. Corresponding clamping strips (also not shown) are arranged to engage against the outer faces of the edge strips at the ends of the mould, and these clamping strips are also provided with upwardly and outwardly sloping surfaces.

The apparatus includes a carriage 26 comprising a horizontally extending frame 27 disposed at a height well above the lower mould 16 and extending beyond it at each side. The carriage 26 also includes vertical frame members 28 fixed to the lateral edges of the frame 27 and extending downwardly. Their lower ends are fixed to inwardly directed members 29 which are fixed to trolleys 30 running on the lower flanges 15 of the rails 13. Thus the carriage 26 can be moved along the rails 13 between the position shown in full lines in FIG. 1 (and in dotted lines in FIG. 2) and that shown in full lines in FIG. 2. The carriage 26 supports an upper mould 31 which can therefore be conveyed by the carriage between the position shown in FIG. 1, in which it is quite clear of the lower mould 16, and that shown in full lines in FIG. 2, in which it is directly above the mould 16.

The upper mould 31 is of rigid formation, being also made of concrete or other suitable material and its lower surface is shaped complementarily to the shape of the upper surface of the lower mould 16. The upper mould 31 is supported from the horizontal frame 27 6f the carriage 26 by means of four two-stage pneumatic cylinders 32 whereby it can be raised and lowered as required. The arrangement of the cylinders 32 is that with one stage of their operation the lift is of short stroke and is heavily damped, and with the second stage the movement is of considerably longer stroke and quick acting.

The mould 31 is provided with passages 33 which extend through it at longitudinally spaced intervals from the upper surface through to ports 34. The ports 34 are located at intervals spaced both laterally and longitudinally, not necessarily at the troughs or crests of the upper mould surface. In general the arrangement should be such as to achieve a substantially uniform pressure distribution over the entire upper mould surface, during operation of the apparatus. One satisfactory arrangement involves the use of ports of 2 mm. diameter spaced at approximately 100 mm. apart, but those near the edges of the mould being approximately 50 mm. apart. As shown in FIG. 4 the ports 34 are also conveniently formed by tubular members 35 embedded in the mould 31 during its manufacture and projecting above the upper surface of the mould to enable flexible tubes 36 to be connected to them. Also as shown in FIG. 4 the tubes 36 lead to spigot connections into manifolds 37 mounted on the upper surface of the mould 31.

The mould 31 has a permanently attached edge strip 38 extending along each longitudinal edge, the lower edge of the strip 38 being flush with the lower surface of the mould 31. Correspondingly strips (not shown) are attached to the ends of the mould 31, their lower edges being shaped to correspond to the shape of the lower surface of the mould. The mould 31 is also equipped with clamping strips 39 which are arranged to engage against the outer faces of the edge strips 38. Suitable quick-action release clamps 40, illustrated diagrammatically in FIG. 4 are provided to enable the clamping strips 39 to be clamped firmly against the edge strips 38, and to be readily freed from such engagement, when this is required. Corresponding clamping strips (not shown) are provided to engage similarly against the strips attached to the ends of the mould 31. The clamping strips of the upper mould hold a second piece of filter cloth 41 in position against the lower surface of the mould 31. A fluid-tight seal between the edge strips 38 and the clamping strips 39 is obtained by clamping a strip 42 between these members above the edge of the filter cloth 41. The strip 42 is made of rubber or other suitable deformable material. The lower edges 43 of the clamping strips are shaped at right angles to the vertical faces and are aligned with the outer edges of the lower surfaces of the mould 31.

As indicated diagrammatically in FIGS. 1 and 2 the lower mould 16 has a vibrator 44, such as an eccentric weight mechanical vibrator, attached to it, and a similar vibrator 43 is attached to the top of the upper mould 31.

The apparatus also includes a further carriage 46 supported by trolleys on the rails 13 and carrying a slurry spreader 47 which is constructed to contain a supply of a slurry of cementitious material for delivery through a discharge slot at its lower end. The carriage 46 can be moved along the rails between the position shown in full lines in FIG. 1, and that shown in dotted lines in FIG. 1, so that the discharge slot of the spreader 47 can traverse the full length of the lower mould 16. The discharge slot of the spreader 47 is shaped to conform to the cross-sectional shape of the panel to be produced in the apparatus, and to provide for the distribution of a layer of cementitious material of uniform thickness (measured in the vertical direction) by the spreader 47 on the lower mould 16. It is to be understood that suitable valve means is provided to close the spreader discharge slot when required.

In using the apparatus, a cycle of operation commences with the movable parts of the apparatus substantially in the positions shown in FIG. 1, i.e., with the upper mould clear of the lower mould in its forward position, and with the slurry spreader also clear of it, at the rearmost position.

The cycle commences with the application of vacuum from suitable suction apparatus (not shown) applied through the passages 17 of the lower mould. The vacuum is of a low order, e.g., about 5 cm of mercury and is intended to remove air bubbles or residual water from beneath the filter cloth 24 and draw the latter firmly against the surface of the mould 16.

In the next stage of the cycle a preformed wire mesh reinforcement 48 is placed over the lower mould. This reinforcement 48 is preformed to the same zig-zag shape as the mould surface and in addition to this it is crimped or otherwise distorted at spaced points so that when it is placed on the mould it rests on the mould surface at these points with the remainder of it held above the mould surface by a vertical distance equal to half the width (in the vertical distance) of the desired panel.

The carriage 46 is then moved forwardly, to the position shown in dotted lines in FIG. 1 and is then moved in the reverse direction with the valve means of the slurry spreader open, so that a layer of slurry of uniform thickness of about 6 mm. measured in the vertical direction, is spread on the lower mould 16 and to enclose the reinforcement. The slurry is confined on the mould by the upwardly projecting clamping strips. The application of the vacuum through the ports in the lower mould is then discontinued. In conjunction with the rearward movement of the carriage 46 in the spreading of the slurry the carriage 26 is also moved rearwardly to bring the upper mould 31 directly over the lower mould 16, and the mould 31 is moved downwardly by the operation of the first stage of the cylinders 32 to locate the mould 31 accurately above the mould 16 and to allow it to rest upon the slurry. The vibrators 44 and 45 are set in operation and, in conjunction with the weight of the upper mould, they cause the slurry confined between the moulds to be displaced from any points of excessive thickness to any points of insufficient thickness.

At this stage a low vacuum is applied through the manifolds 37, from the suction apparatus, to the ports 34 of the upper mould. The low vacuum is built up progressively over a period of about 20 seconds to a value of about 40 cm of mercury, or alternatively the vacuum may be applied in pulses of the same order of value over a corresponding period of time. It may be found desirable to alter these criteria to suit particular circumstances. The application of the vacuum removes excess air and water from the slurry. Failure to build up sufficient vacuum will limit the amount of moisture removed to too low a level, leaving the resultant material too moist while too sudden application may result in too great a variation of the physical condition of the material with insufficient compaction in some regions and an undesirably large number of air voids in its structure. The arrangement of the manifolds 37 with the tubing 36 arching upwardly from the upper side thereof before connecting to the tubes 35 ensures that between vacuum pulses there is no appreciable return flow of moisture to the material.

The provision of the filter cloth on the upper mould facilitates the distribution of suction over the entire surface of the slurry, and the general result of this phase of the cycle is that after it has been carried out the slurry has been consolidated, it has lost its plasticity and it has become sufficiently self-supporting to constitute an uncured panel which can be lifted as a whole without losing its shape and without the reinforcement moving within it, and which can be placed in a stack of up to thirty similar articles, without ensuing damage, and particularly without adhesion of panels resulting.

While the slurry is confined between the upper and lower moulds the clamping strips of the two moulds are in close proximity to each other. As the clamping strips of the upper mould are sealed to the edge strips of that mould the lower faces of the clamping strips provide a relatively impervious seal where they bear on the slurry around the boundary of the upper mould and thereby they avoid an excessive intake of air which would otherwise occur. Excessive intake of air would be undesirable not only in that it would prevent the build up of sufficient vacuum over all, but also in that withdrawal of water would be insufficient in some zones. It is desirable to have a slight clearance between the adjacent edges of the clamping strips of the upper and lower moulds in order to avoid undesirable interference by the lodgement of sand grains between them. The surface 25 of the lower clamping strips 22, and the corresponding surfaces of the lower clamping strips at the ends of the lower mould provide the moulding surfaces for the edges of the panels and ensure that the panels have finished edges which do not require dressing down at a later stage.

At the appropriate stage the vibrators are stopped but the vacuum is still applied through the ports of the upper mould. Then, in order to achieve proper release of the uncured panel from the lower mould 16 a controlled amount of water is admitted through the ports 18 thereof to the filter cloth 24. The best means of admitting water for this purpose is by injecting a mixture of water and gas in the form of foam. This can be achieved by arranging a container 49 indicated schematically in FIG. 1, partially filled with water containing a foaming agent and embodying a mechanical agitator, arranging an outlet from this container 49 at an appropriate level to convey the foam through a manifold and lines to the ports 18 of the lower mould 16, and applying pressure to the container to force the foam through to the parts 18. Application of the foam enables a small quantity of water to be distributed rapidly through the filter cloth 24 so that when the uncured panel is raised the lower surface thereof separates cleanly from the filter cloth and retains a good surface finish.

Raising of the panel is effected in the next stage in which the cylinders 32 are operated in their first stage in the reverse direction, while maintaining suction through the ports 34 of the upper mould. The upper mould 31 and uncured panel are thus lifted clear of the lower mould 16, and thereupon the carriage 26 is moved forwardly to the position shown in full lines in FIG. 1. In this position of the carriage 26 the cylinders 32 are then operated in their second stage to lower the mould 31 and the attached uncured panel as indicated by the dotted lines in FIG. 2.

Preferably a table or like support, having an upper surface corresponding to the configuration of the panel, is disposed so that when the cylinders 32 are operated the uncured panel and upper mould 31 come to rest upon it. At this stage the application of vacuum through the ports 34 is discontinued by shutting of the connection of the manifolds 37 to the suction apparatus, and instead the manifolds 37 are connected to the foam supply line from the container 49 so that a small controlled amount of water is admitted by way of the ports 34 and filter cloth 41 to the overall surface of the uncured panel. This releases the panel cleanly from the upper mould which is then raised to the position of FIG. 1, thereby completing the cycle of operations for producing one panel.

For each succeeding panel the cycle of operations is repeated, each new uncured panel being deposited directly on top of the previously formed panel until a stack of uncured panels of up to about 30 in number has been produced. These panels, together with their table or like support can then be removed as a body by a fork-lift truck or other suitable means, a further table or like support placed in position, and the creation of the next stack of panels can be commenced.

It will be evident that it is not necessary to complete the cycle of operations for one panel before commencing those for the next. Thus as soon as the upper mould 31 has been raised from the lower mould 16 with an uncured panel and moved forwardly, the lower mould can be prepared for the application of reinforcement and slurry for the next panel.

The arrangement of the manifolds 37 with the tubing 36 arching upwardly from the upper side thereof before connecting to the tubes 35 is also useful in relation to the admission of the controlled amount of water to the filter cloth 41 for releasing the panel from the upper mould. Without such an arrangement there would be a strong possibility of the mixture of gas and water separating into its components, and an uncontrolled excess amount of water gravitating from the manifolds through to the cloth 41.

I claim:

1. Apparatus for producing reinforced cement panels comprising a fixed lower mould, slurry depositing means for applying a layer of slurry to the lower mould, an upper mould having a lower surface shaped complementarily to the upper surface of the lower mould, means for moving the upper mould between one position in which it is above the lower mould and a second position in which it is remote from it, and means for applying suction through the upper mould to the lower surface thereof.

2. Apparatus according to claim 1 in which both the upper and lower moulds have spaced ports through which suction can be applied to withdraw moisture and through which a small quantity of liquid can be transmitted through to the appropriate surface to the uncured panel to release it from the surface at the appropriate stage.

3. Apparatus according to claim 2 in which each mould surface is provided with a layer of filter cloth whereby the moisture can be withdrawn in a uniform manner over the full surface area of the mould.

4. Apparatus according to claim 3 in which the moulds are made of rigid material with detachable clamping strips whereby the layers of filter cloth can be fixed thereto.

5. Apparatus according to claim 2 in which the ports of the upper mould are connected by arched tubes to the upper surfaces of suction manifolds to avoid undesired reverse flow of liquid from the manifolds through the said ports.

6. Apparatus according to claim 2 having vibrators connected to the moulds.

7. Apparatus according to claim 4 in which the clamping strips of the upper mould have fluid-tight engagement with the edges of the upper mould and are provided with lower surfaces arranged to seat in substantially impervious engagement upon the slurry confined by the clamping strips of the lower mould, said clamping strips of the lower mould forming part of the moulding surface for the panel.

8. Apparatus according to claim 7 wherein the clamping strips of the lower mould are arranged to provide a slight clearance between their inner faces and the lower outer edges of the clamping strips of the upper mould, to avoid undesirable interference by the lodgment of sand grains between these parts.

* * * * *